United States Patent [19]

Kearns et al.

[11] Patent Number: 5,908,044
[45] Date of Patent: Jun. 1, 1999

[54] QUADRA-SEAL METHOD AND APPARATUS FOR OPERATIONS UPON FLUID PRESSURE CONTAINMENT BODIES

[75] Inventors: John P. (Pat) Kearns, Alvin; George W. Harrison, Houston, both of Tex.

[73] Assignee: Team, Inc., Alvin, Tex.

[21] Appl. No.: 08/980,126

[22] Filed: Nov. 26, 1997

[51] Int. Cl.⁶ .......................... F16K 43/00; F16K 41/02
[52] U.S. Cl. ...................... 137/15; 137/315; 137/318; 29/402.01; 29/890.121; 277/312; 277/513; 277/515; 228/2.3; 228/114.5; 228/119; 251/214
[58] Field of Search .................... 137/318, 315, 137/15, 237, 246.12, 246.22; 29/402.02, 402.01, 890.121, 890.131, 890.148; 228/2.1, 112.1, 2.3, 114.5, 119; 251/214

[56] References Cited

U.S. PATENT DOCUMENTS

| | | | |
|---|---|---|---|
| Re. 27,895 | 1/1974 | Ray | 137/15 |
| Re. 29,448 | 10/1977 | Brown et al. | 156/73.5 |
| Re. 35,116 | 12/1995 | Butler et al. | 137/15 |
| 90,371 | 5/1869 | Lynch . | |
| 1,065,248 | 6/1913 | Hinman . | |
| 2,077,507 | 4/1937 | Yancey | 29/84 |
| 2,145,489 | 1/1939 | Michaels | 281/5 |
| 2,299,517 | 10/1942 | Volpin | 251/102 |
| 2,600,497 | 6/1952 | Hamer | 138/89 |
| 2,658,391 | 11/1953 | Grant | 73/389 |
| 2,763,282 | 9/1956 | Reedy et al. | 137/318 |
| 2,795,039 | 6/1957 | Hutchins | 228/114 |
| 2,840,100 | 6/1958 | Stephenson | 137/318 |
| 3,068,726 | 12/1962 | Nooy | 77/41 |
| 3,157,203 | 11/1964 | Ver Nooy | 138/89 |
| 3,229,711 | 1/1966 | Leopold, Jr. et al. | 137/318 |
| 3,238,612 | 3/1966 | Herman | 156/104 |
| 3,347,261 | 10/1967 | Yancey | 137/315 |
| 3,568,299 | 3/1971 | Calton et al. | 228/113 |
| 3,616,980 | 11/1971 | Padilla | 228/2.3 |
| 3,626,576 | 12/1971 | Ray | 29/402.02 |
| 3,687,166 | 8/1972 | Herrin | 138/94 |
| 3,703,906 | 11/1972 | Tickett | 137/15 |

(List continued on next page.)

FOREIGN PATENT DOCUMENTS

| | | |
|---|---|---|
| 1 293 141 | 7/1969 | United Kingdom . |
| 1 297 847 | 4/1970 | United Kingdom . |
| 2145489 | 8/1984 | United Kingdom . |
| PCT/GB86/00242 | 7/1986 | United Kingdom . |
| PCT/GB96/00241 | 7/1986 | United Kingdom . |

*Primary Examiner*—George L. Walton
*Assistant Examiner*—Bryan C. Wallace
*Attorney, Agent, or Firm*—Matthews, Joseph, Shaddox & Mason, P.L.L.C.

[57] ABSTRACT

An apparatus for injecting sealant into the packing chamber of a valve requiring no venting of pressure within the valve. The apparatus which includes an interior valve is attached to the valve body by drilling and tapping a connection or by friction welding. A high pressure packing gland is attached to the apparatus and a drill bit is passed through the combination to complete an opening into the packing chamber. The drill bit is withdrawn past the interior valve, which is closed and then out of the combination. The packing gland is removed and a sealant injection device attached. The interior valve is opened and sealant injected into the packing chamber. The valve is closed, a completion plug installed into the end of the fitting, and a completion cap with a sealing ring is installed over the entire valve and fitting, thereby forming multiple redundant seals.

26 Claims, 11 Drawing Sheets

OTHER PUBLICATIONS

| | | | |
|---|---|---|---|
| 3,704,821 | 12/1972 | Loyd et al. | 228/2.3 |
| 3,753,820 | 8/1973 | Ishikawa et al. | 156/73.5 |
| 3,833,020 | 9/1974 | Smith | 138/94 |
| 3,863,667 | 2/1975 | Ward | 137/318 |
| 3,867,964 | 2/1975 | Gardner | 138/89 |
| 3,882,593 | 5/1975 | Lucas | 228/113 |
| 3,905,718 | 9/1975 | Luckenbill et al. | 408/111 |
| 3,972,464 | 8/1976 | Codo et al. | 228/112 |
| 3,974,846 | 8/1976 | Serota | 137/15 |
| 3,995,655 | 12/1976 | Sands | 137/318 |
| 4,018,420 | 4/1977 | Muller et al. | 251/172 |
| 4,119,115 | 10/1978 | Carruthers | 137/318 |
| 4,127,141 | 11/1978 | Ledonne et al. | 137/15 |
| 4,177,998 | 12/1979 | Laitkep et al. | 277/59 |
| 4,213,554 | 7/1980 | Sciaky | 228/47.1 |
| 4,260,094 | 4/1981 | Stroo | 228/112 |
| 4,328,974 | 5/1982 | White | 277/308 |
| 4,331,280 | 5/1982 | Terabayashi et al. | 228/112 |
| 4,350,052 | 9/1982 | Kendall | 73/863.86 |
| 4,648,422 | 3/1987 | Amblard | 137/318 |
| 4,702,405 | 10/1987 | Thomson et al. | 228/2.3 |
| 4,711,013 | 12/1987 | Hannah et al. | 29/402.02 |
| 4,756,465 | 7/1988 | Pranch et al. | 228/115 |
| 4,916,938 | 4/1990 | Aikin et al. | 73/46 |
| 5,052,047 | 9/1991 | Butler et al. | 137/318 |
| 5,062,439 | 11/1991 | Butler et al. | 137/318 |

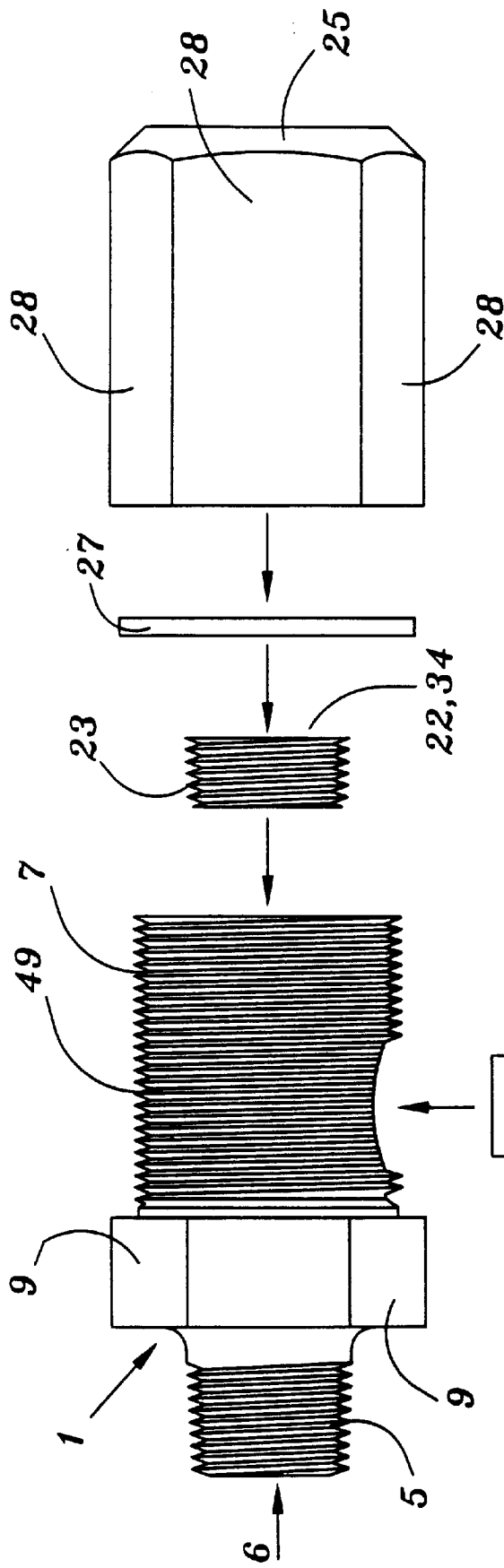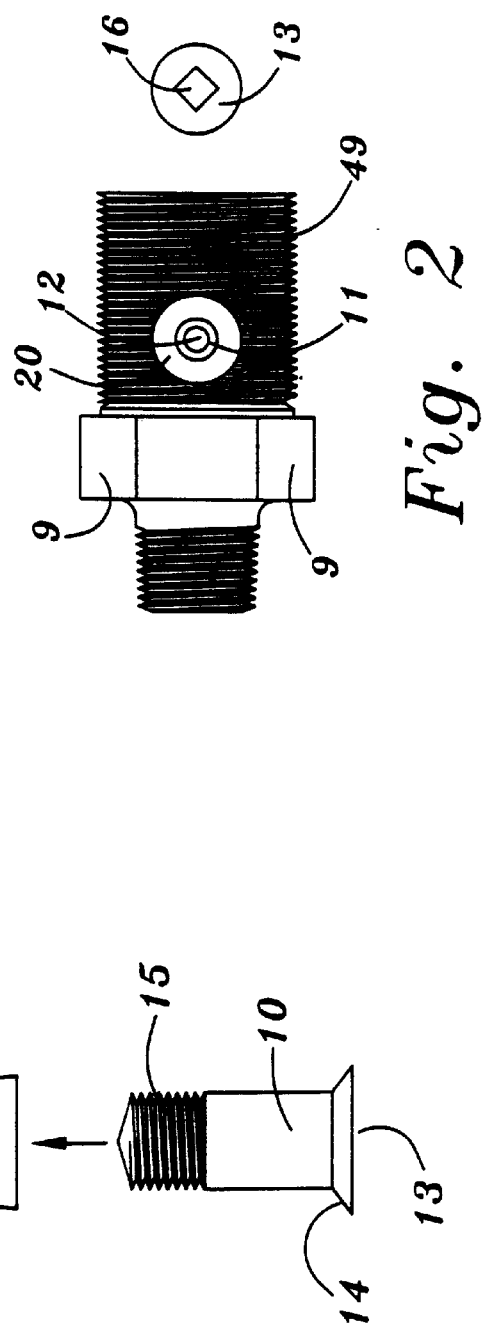

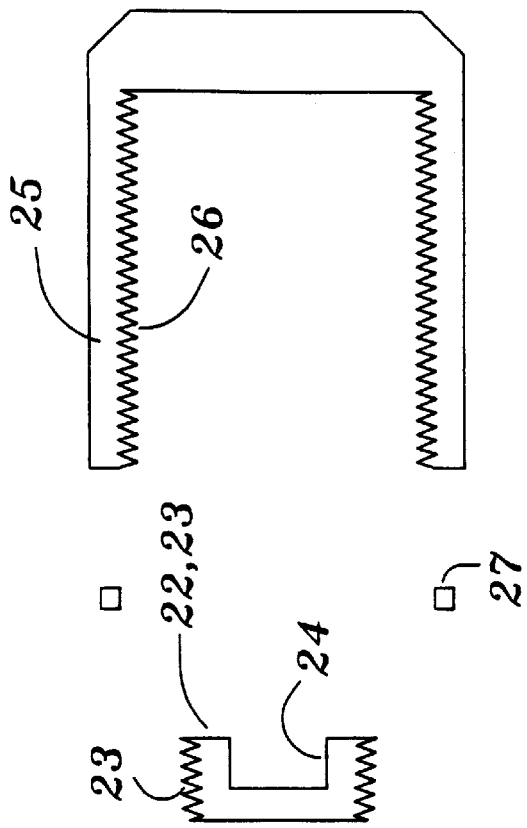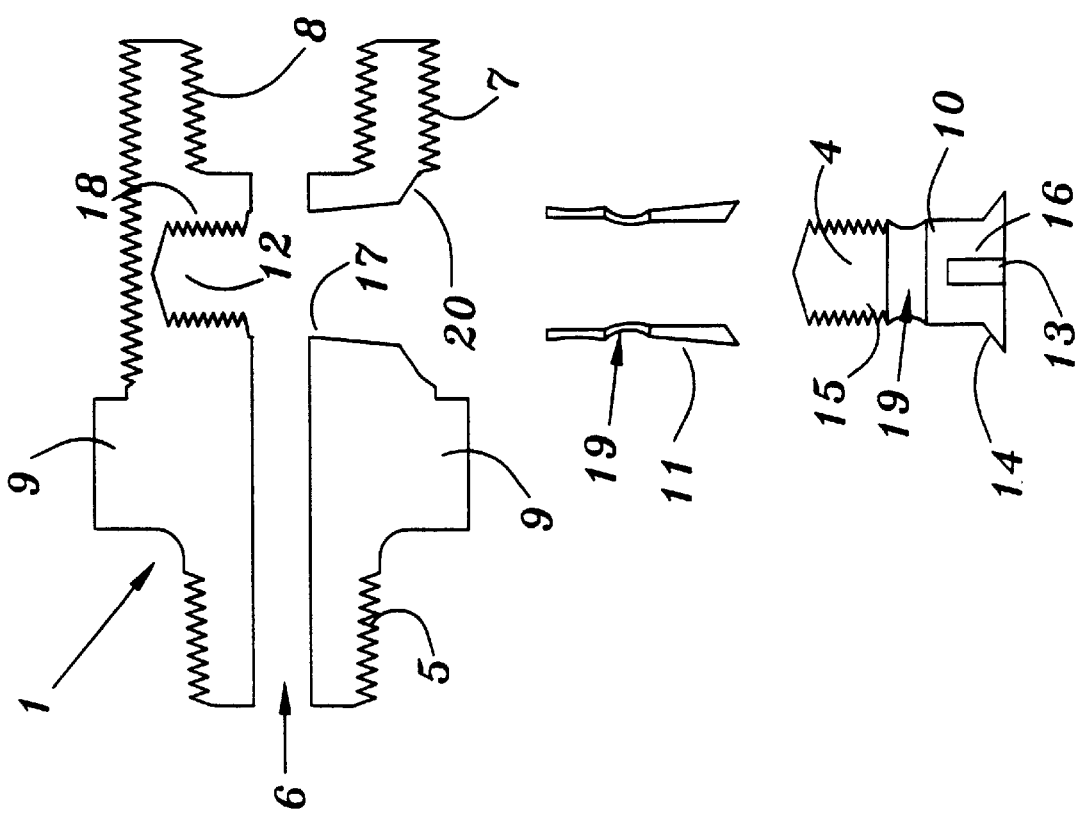
Fig. 4

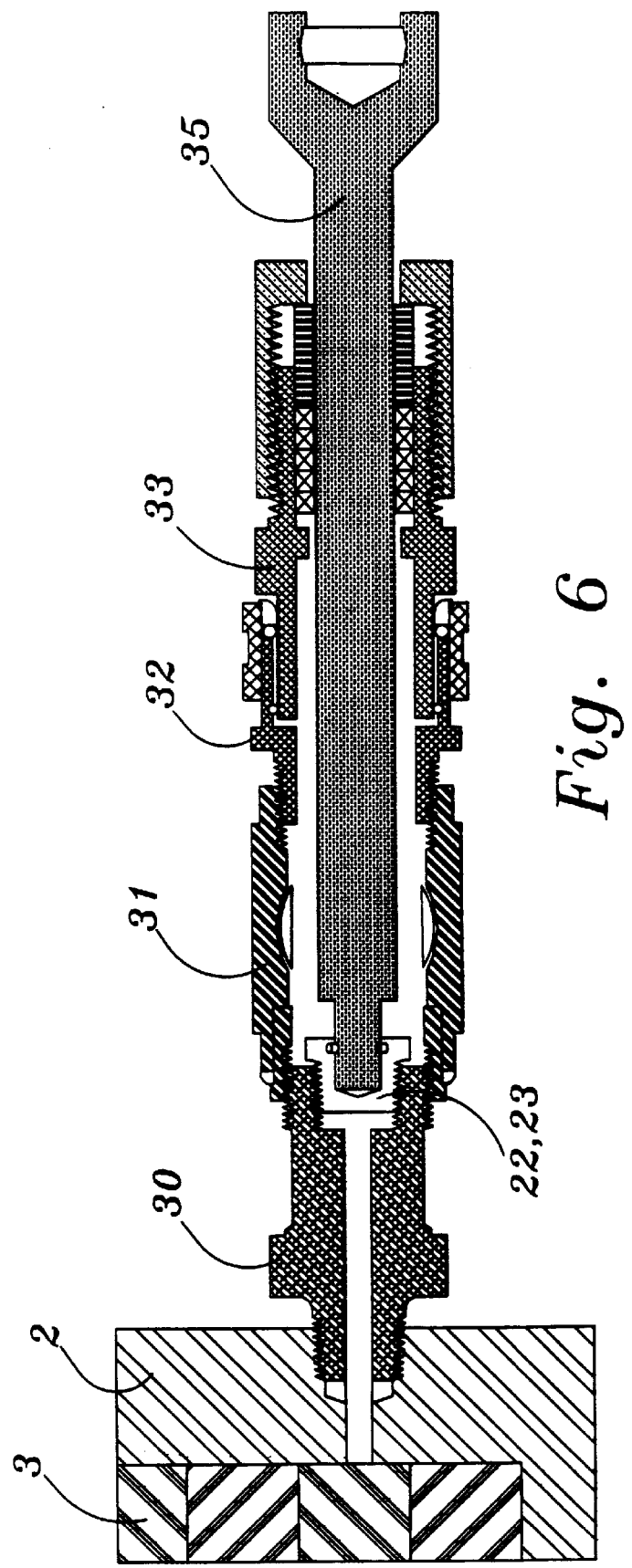

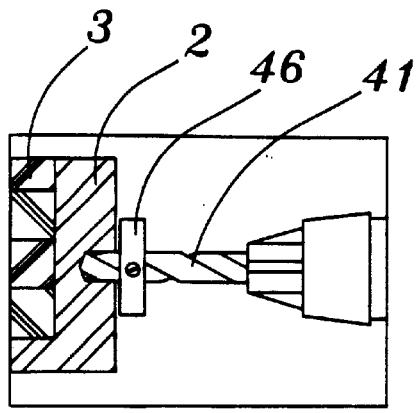
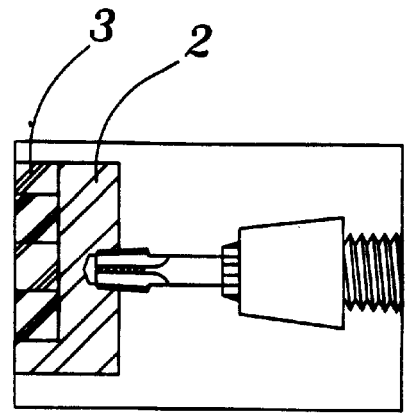
Fig. 7a
Fig. 7b
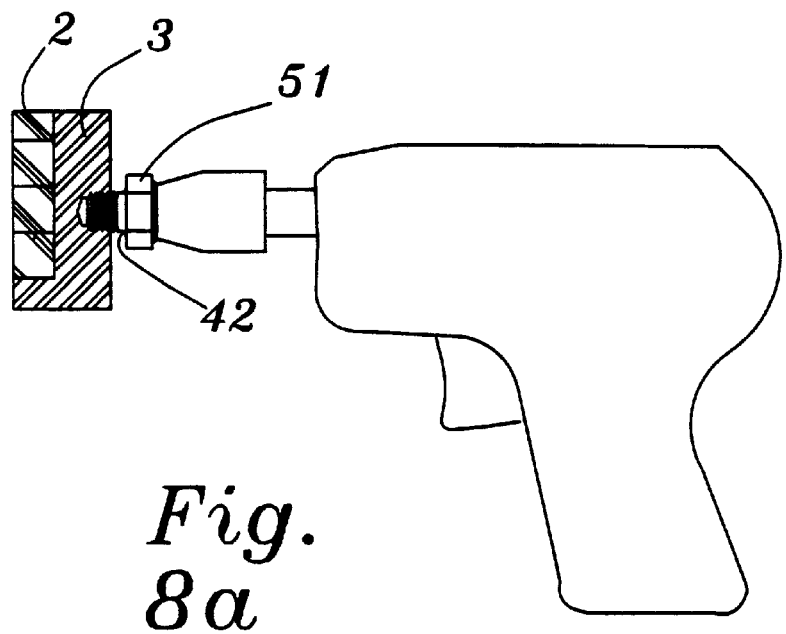
Fig. 8a
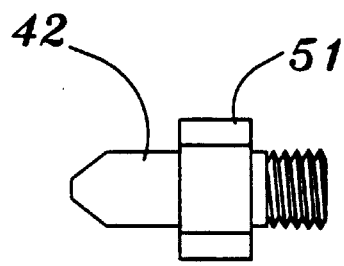
Fig. 8b

QUADRA-SEAL METHOD AND APPARATUS FOR OPERATIONS UPON FLUID PRESSURE CONTAINMENT BODIES

BACKGROUND OF THE INVENTION

FIELD OF THE INVENTION

This invention relates to a fitting for attachment to a pressurized valve or pressure containing component to be used to inject a sealant into the valve or component to eliminate or substantially reduce leakage there through. More particularly the invention relates to a fitting that provides a simpler more compact fitting that eliminates risks associated with using external valves or extensions, and at the same time provides additional and multiply redundant seals to further reduce or eliminate leakage from the fitting itself after installation.

The invention also more particularly relates to more recent applications under environmental regulations that require plugs on the open end of all valves. Problems arise because in the event the valve leaks there is no way to vent or purge the plug. The present invention has applications as a replacement for end plugs that allows multiply redundant seals and also allows the possibility of venting pressure from a leaking valve without allowing excess emissions into the environment.

Industrial complexes are characterized by miles of pressurized piping carrying products that may be hazardous should they be released to the environment. Low grade releases or leaks do occur, commonly associated with valuing used with the piping. A source of such leaks may be the deterioration of the packing along the valve stem. Sealant injected into the packing chamber of valves or into pipe clamps may eliminate or reduce such leaks. It is desirable and may be necessary at times to carry out such service while the valve or pipeline is still fully under pressure. These conditions dictate a need to carry out the service with a minimum exposure time for the technician.

Various approaches to the problems identified have been developed. The Preston U.S. Pat. No. RE. 23,526 was issued in 1952. It teaches an attachment body, a valve, and a containment body, which incorporates the stuffing box. Long extensions of these components are required to install the final plug, and no multiple seals are provided. The Reddy U.S. Pat. No. 2,763.282 issued in 1956. It teaches similarly to the Preston reference. U.S. Pat. No. 5,052,427, to Butler, et al., issued in 1991 adds the variation of attaching the fitting to the valve by friction welding rather than drilling and tapping threads. This reference still requires a series of multiple components creating a risk of knock off from the cantilever effect of a drill or injection gun, connected to a packing gland, in turn connected to a valve which would finally be connected to the attachment fitting. The combination of components and their configuration does not teach or allow for the multiple redundant seals of the present invention. Additionally, unless utilized in its separate components, the ability to use friction welding, which requires high rotational speeds, is greatly impaired by the unbalanced protrusions of the pin forming the fitting valve.

OBJECTS OF THE INVENTION

The purpose of the invention is to create an injection valve that is positive pressure retentive preventing emissions of volatile hydrocarbons when an on stream orifice is made to at leaking valve packing gland.

The development of this invention, the "Quadra-Seal" was initiated to address industrial needs to reduce hydrocarbon emissions in jointed applications. The sealing nature of the invention allows the onstream boring of an orifice into the pressurized packing area of a valve without releasing additional hydrocarbon product to the environment.

Additional applications are possible with the present invention. An environmental regulation requires a plug at every open valve, which creates the problem of venting the fluid that leads into the end of the valve adjacent the plug in the event of a leak. A Quadra-seal device of the present invention can be used to replace the plug. With its double redundant seals, leaks arc contained and venting is possible for any leakage past the valve. It is also an application to utilize the present invention on any body containing fluid under pressure, permitting a tap or opening into that body without allowing the escape of the fluid. Applications allow measurement of flow, in the manner of a pitot tube and measurements of any differential in fluid pressure.

The "Quadra-Seal" is different from previous devices. The Quadra-Seal provides an internal valve and seal within the body of the invention, the fitting or injection plug, and does not rely on external means such as a ball valve connected by means of threads or other attachments to provide the containment. Additionally, conventional devices for sealant injection can be used without further modifications when the Quadra-Seal is used. A conventional sealant injection gun can be coupled directly to the Quadra-Seal without extending the assembly and creating potentially hazardous operations such as breaking the injection valve coupling to the leaking valve. The internal valve is configured so that a completion cap can completely encapsulate the valve and seal against the fitting.

SUMMARY OF THE INVENTION

It is an object of the present invention to provide a solution to the industry need for a method and device to contain volatile hydrocarbon or process emissions. In particular, the problem would be a leaking valve and hydrocarbon emissions. The solution presented by this new and useful invention is a tight, secure, pressure retentive valve injection plug or fitting, utilized when a valve's packing is exhausted or leaking.

The present invention provides an apparatus and method for injecting sealant into the packing chamber of a valve requiring no venting of pressure within the valve. The invention comprises a fitting with an interior valve which is attached to the valve body by drilling and tapping a connection or by friction welding or otherwise. A high pressure packing gland is attached to the apparatus and a drill bit is passed through the combination to complete an opening into the packing chamber. The drill bit is withdrawn past the interior valve, which is closed and then the bit is withdrawn out of the combination. The packing gland is removed and a sealant injection device attached. The interior valve is opened and sealant injected into the packing chamber. The valve is closed, a completion plug installed into the end of the fitting, and a completion cap with a sealing ring is installed over the entire valve and fitting. thereby forming multiple redundant seals.

There are four main sealing points: (1) an internal composite seat that seals the rotational stem of the internal quarter turn valve, (2) a conical metallic seal on the interior of the opening provided for the stem of the quarter turn valve (the stem and cap of the internal quarter turn valve is softer than the seat and so as installed, it deforms to form its own additional seal within the seat), (3) a completion Plug to seal the open end, and (4) the fourth seal is a completion cap with a metallic sealing seat ring. The Quadra-Seal device requires no extensions that increase attachment stress and risk of "knock-off". The compact and balanced configuration is optimum for use with the available friction welding equipment. The plug or fitting prevents volatile hydrocarbon or process emissions at jointed applications and provides fast, easy, economical installation with conventional tools and equipment. The device attaches compactly to a valve's body and reduces "window of exposure" time to potential hazards.

BRIEF DESCRIPTION OF THE DRAWINGS

The foregoing features and other below described aspects of the invention would be explained in greater detail when the following description is read and taken into consideration in conjunction with the accompanying drawings, wherein:

FIG. 1: is an exploded view of the components of the present invention.

FIG. 2: is a top view of the apparatus of FIG. 1.

FIG. 4: is a cross section of the exploded view of FIG. 1.

FIG. 6: is a cross section through devices used previous to this invention.

FIG. 7(a), 7(b), are cross sections illustrating steps in the installation of the invention.

FIG. 8a: is an illustration of a method of installation of the invention.

FIG. 8b: is an illustration of an alternative embodiment of the invention.

DETAILED DESCRIPTION OF THE PREFERRED EMBODIMENT

Figure 3:
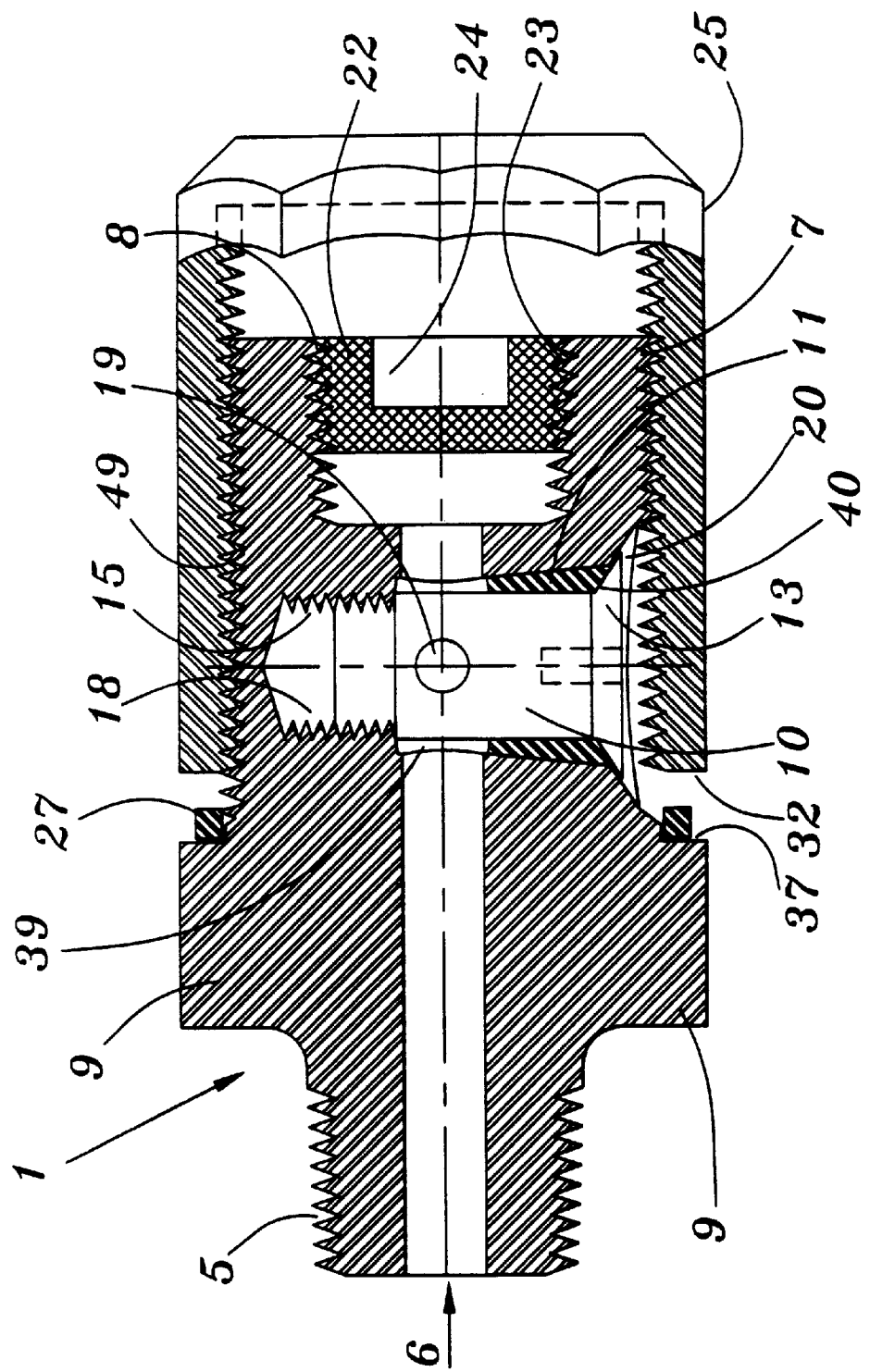
FIG. 3: is a cross section through an assembled apparatus of FIG. 1.

The method and apparatus of the present invention will now be described with reference to the accompanying and previously described drawings, FIGS. 1–14 for which like reference numbers indicate like components. Valves are typically provided, at the valve stem, with packing materials to prevent the escape of harmful emissions through the stem bore and the valve. Over time, the packing material deteriorates. The percentage of emissions are checked, for example, with an OVA meter (Organic Vapor Analyzer) and if the emissions are excessive, the valve follower bolting can be first tightened down. If that does not reduce the amount of emissions, in the worst case, the line may have to be shut down and the valve removed for repair or replacement. The present invention mounts a fitting or an injection plug 1 to the valve body 2 FIG. 5 for injecting a sealant packing material to bring the emissions to stop or reduce the emissions to an acceptable level.

This invention provides a new and improved method and apparatus for access to a leaking valve packing gland area 3 onstream by attachment of an injection plug or fitting 1 carrying a self contained internal valve 4 to a valve body 2. The fitting 1 is attached by drilled and tapped tapered pipe threads. FIGS. 7, or other attachment methods such as friction welding, FIG. 8. which will be described in more detail below.

Figure 8C:
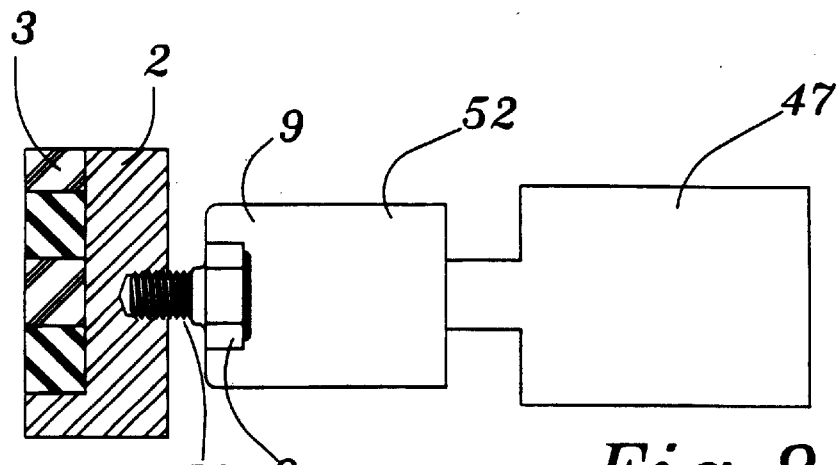
FIG. 8c: is an illustration of an alternative method of installation.

Referring to FIGS. 1, 3, 4 and 13, the invention is seen to comprise: the fitting 1 which in a primary embodiment is provided with external tapered pipe threads 5 on a first end, a longitudinal orifice 6 through the fitting to a second end, and both external 7 and internal 8 threads on the second end. In this embodiment the fitting 1 is also provided with a hexagonal shoulder or flats 9 for using a wrench to install the fitting. Alternatively, the first end of the fitting can be configured for installation by friction welding as illustrated in FIGS. 8b, and 8c, in which case the wrench flats 9 may be unnecessary or may be useful for driving by the friction welder.

As shown in FIGS. 1, 2 and 3, in the primary embodiment the threads 7 do not extend full length on the exterior of the valve end of fitting 1. The end of the fitting 1 is threaded, but the threads are discontinued at 49 from forward of the valve 4 toward the center of the fitting, to allow for additional material thickness where bores 12 and 17 are made into the fitting as will be described in more detail below.

Referring to FIGS. 1, 2, 3 and 4, the components of the self contained internal valve 4 are seen to comprise a valve stem 10 and a cylindrical valve seat 11. The valve stem 10 is mounted in a bore 12 drilled or otherwise formed in the fitting 1 perpendicular to, and intersecting with, the longitudinal bore 6. The valve seat 11 is mounted in a coaxially aligned larger bore 17. FIGS 2, 4. The valve stem 10 is formed with a head 13 with a conical seating undersurface 14 and threads 15 on the end opposite the head. The head 13 is provided with recessed torque driving surfaces 16 to permit application of rotational torque to the stem by a screwdriver, allen key, square drive, or torx driver or other equivalent device. All threads can be coated with nylon high temperature resistant coatings or other coatings to prevent leakage.

As shown best in FIG. 3, the composite seat or cylindrical seat 11, is installed with a press fit or otherwise to sealing tolerances into the larger bore 17 extending through axially drilled bare 6, which as mentioned is made coaxially with the bore 12 for the valve stem, but which extends to a depth some distance below the intersecting orifice 6, but not to the same depth as bore 12 forming a seating shoulder at the bottom of 17. Thus the lower portion of 39 of the seat 11 as it extends, ensures a positive seal at the orifice 6. The length of the cylindrical seat 11 is sufficient that the upper portion 40 extends slightly into a truncated conical concavity 20, which forms a mating configuration conforming to the conical undersurface 14 of the head 13 of the valve stem 10. It is desirable to have the cylindrical composite seat 11 extend slightly above the top of the larger circular bore 17 and somewhat into the truncated conical concavity 20 so that as the valve stem 10 is fully installed, the conical undersurface 14 of the valve stem 13 bearing down against the upper portion 40 of the cylindrical seat 11 will put the seat 11 into compression as it bears against the lower portion of the larger bore 17 at 39. As this composite seat is put into compression, vertically it has a tendency to expand, even if incrementally, in both radial directions, and thus a tight press fitted seal 11 when pre-loaded by the compression will make an even tighter more positive seal between the valve stem 10 and wall of bore 17. In addition, extending the upper surface of the cylindrical seal 11 at 40 slightly above the metal truncated conical concavity 20 will form a double seal at the undersurface 14 of the valve stem head 13. In the envisioned primary embodiment, the double seal will be both a composite seal against a portion of the cylindrical seal at 40 and a metal-to-metal seal between the metal of fitting 1 and the conical undersurface 14 with head 13 of the valve stem 10.

The composite seat and the incremental extension and ability to be pre-loaded as the valve stem is fully seated enables the present invention to form a positive seal which can address a problem in the industry with prior art devices as described herein, and more particularly as illustrated in FIG. 6. The problem with devices presently in use is that at very high pressures, it is sometimes very difficult for the operator to tell when the completion plug 34 is set. Although attempted remedies have utilized a set screw restriction to slightly reduce the pressure so that the operator can tell when the completion Plug 34 is set by the setting tool 35, there has not been a combination as described or taught by the present invention with a valve, valve seat, and further a valve seat that can be pre-loaded to positively seal about the valve stem 10. Tests of the invention with methane, have shown there are no leaks when the invention is used as taught and described herein.

The envisioned steps for assembling the internal valve 4 within the fitting 1 are as follows: the body of the fitting 1 is drilled perpendicular to the longitudinal orifice 6 by a tap drill to a precise depth so as not to penetrate the opposite wall thickness. See FIGS. 3 and 4. This orifice 12 is then counter-bored by use of a tapered reamer through the longitudinal orifice 12, not to exceed the depth for other functions to be processed. A larger cylindrical bore 17 is made to a sufficient minimum depth at 39 so as to allow the conical head 13 of the stem 10 to seat and so as to also allow the completion cap 25 to be threaded over the fully installed stem head 13 without interference as will be described below in more detail. As so placed, the cap 25 can directly abut a face of the 37 of the shoulder 9. FIG. 3. An additional counter sunk, truncated, cylindrical concavity 20 is made at the aperture of the orifice 12, to allow the head 13 of the valve stem 10 to rest below the threads 7 of the fitting 1. and so permit a threaded cap 26 to be fitted completely over the threads 7 thus encapsulating the internal valve 4 components. The bore 12 into the body of the fitting 1 is then tapped at the lower portion to provide threads 18 for holding the stem. The cylindrical seat 11 is installed, generally by press fitting, and the stem 10 is then screwed in and installed to the full closed position which is indicated by seating the head 13 of the stem 10 to the conical metal seat 20. FIG. 3. At this position, the head 13 of the stem 10 is scored ¼ turn relative to or perpendicular to the longitudinal orifice 6 to indicate the closed position for the internal valve 4. The stem 10 is then rotated ¼ turn counterclockwise from fully closed to the open position, where the score indicates open and is parallel to the longitudinal orifice 6. The stem is then bored through, by for example passing a drill bit completely through the combined fitting and valve 4, thereby forming a port 19 through the valve stein 10 and seat 11. FIG. 4.

The valve 4 as thus described is "closed" when seated, and the limited ¼ turn rotation required to actuate the valve limits wear and tear on the cylindrical seat 11 and any thread coatings, extending their life as leak sealers. In the event the seal 11 or thread coatings wear to the extent they leak, both are replaceable.

Figure 5:
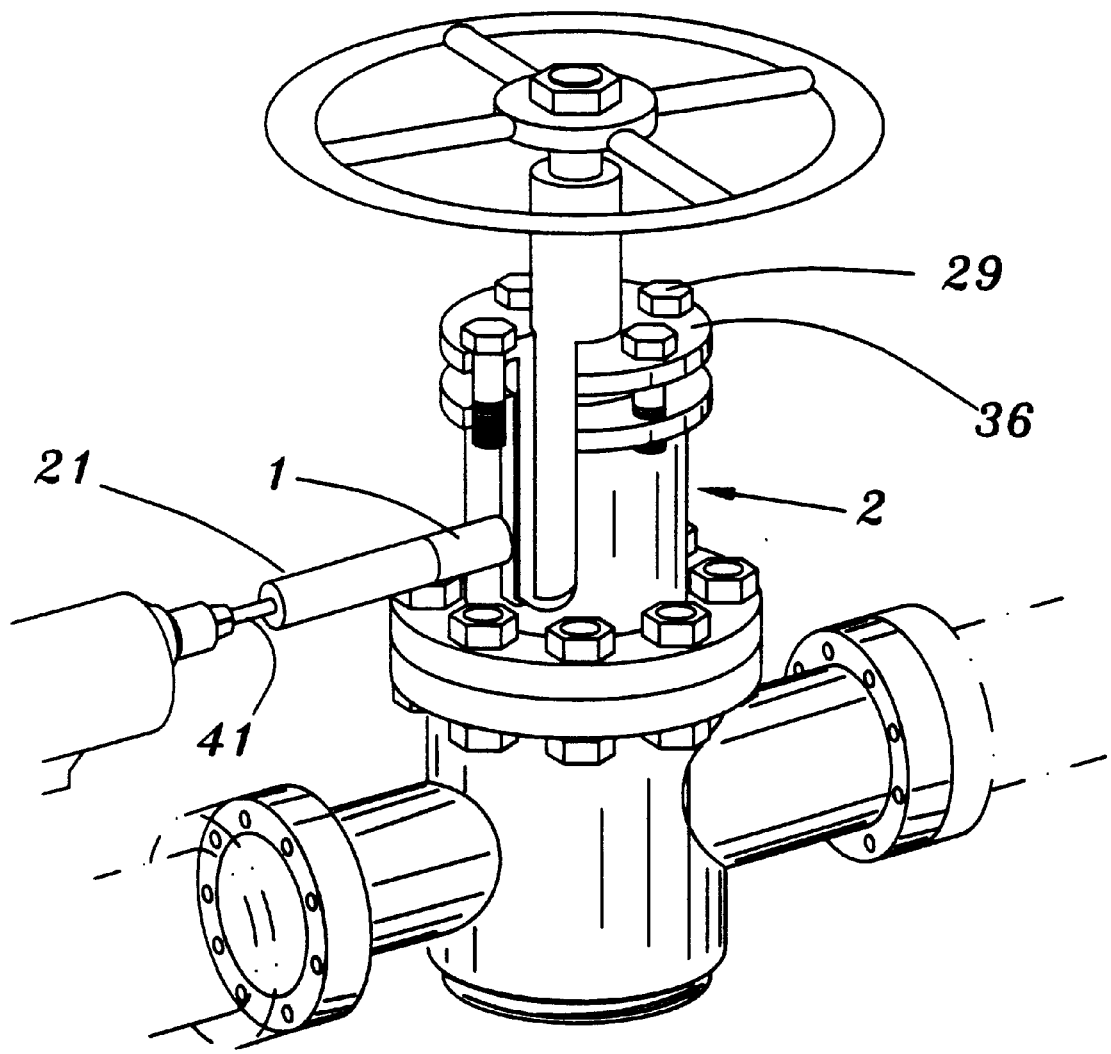
FIG. 5: is a perspective of the installation procedure for the invention.
Figure 5A:
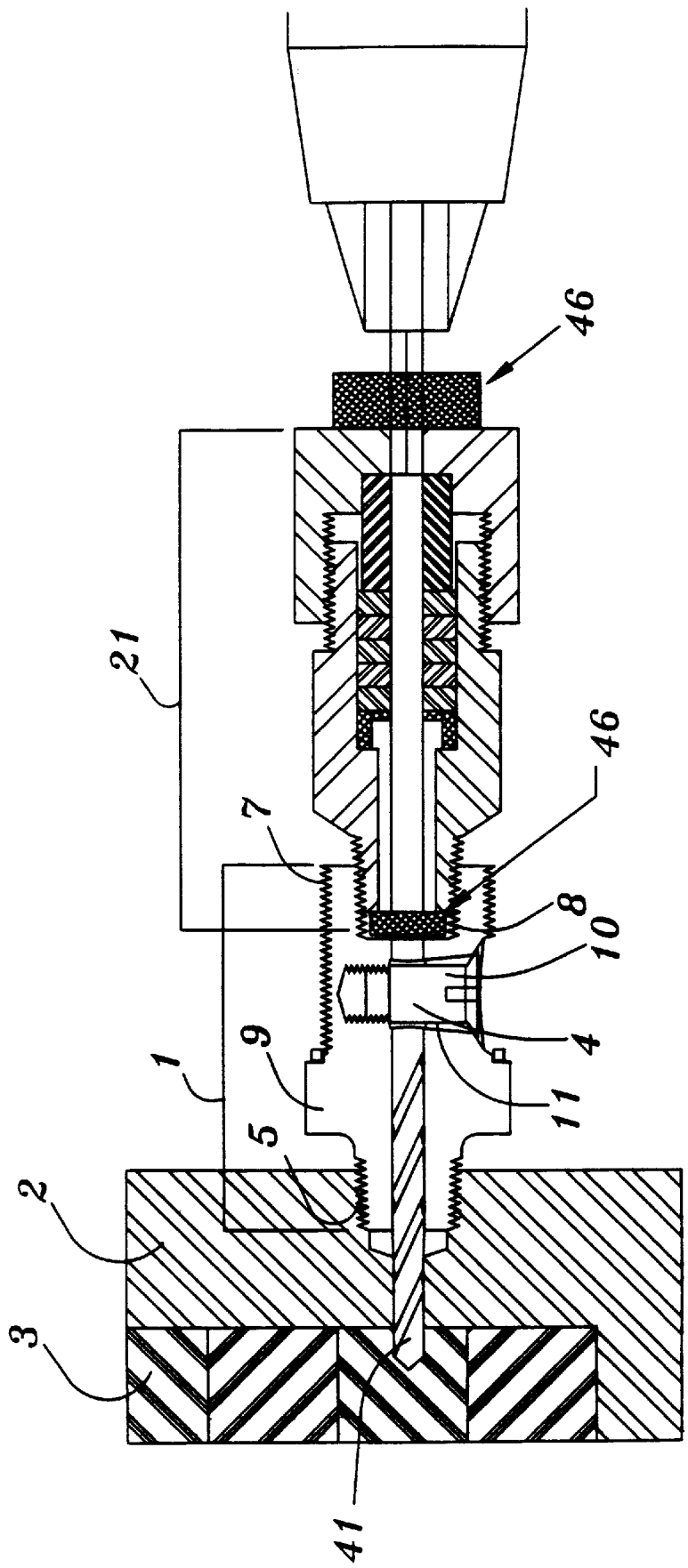
FIG. 5(a): is a cross section of an installation.

As shown in FIGS. 3, 4, 5 and 5a, the longitudinal orifice 6 permits insertion of a boring tool. The boring tool, usually a drill bit 41, is used with a high pressure packing gland 21 to contain leakage from the second end of the fitting 1 when the boring tool penetrates the valve packing gland are 2. FIG. 5a. The boring tool is withdrawn through the orifice and the valve 4 is turned the quarter turn to the shut position. This will tighten the frictional contact of the valve stem to the seat 11 and allow removal of the high pressure packing gland 21. A sealant injection device such as for example, a grease gun is attached to the open second end of the fitting by the threaded connection 8. The stem 10 is quarter turned to the open position. This will allow the sealant to be injected through the orifice 6 to the leaking valve packing 3 area. When the seal is affected, the stem is again closed and the injection gun removed. The description of the operation of sealing, installation and injection will be further described in more detail below.

A completion plug 22, (FIGS. 1, 3, 4, and 13) is provided for installation in the threads 8 in the second, open end of the fitting 1 to prevent leakage in the event the pressurized fluid leaks past the stem seat 11 due to age or chemical erosion. The stem 10 of the valve 4 has a head 13 designed with a conical undersurface 14 to mechanically seat as the stem is closed. The materials, to be described in more detail below, provide that initial installation creates a burnished mechanical seal between the conical surface 14 and the counterbore 17 to help prevent fluid leaks past the stem seat 11 due to age or chemical erosion. The use of conically machined metal to composite seats seals the rotational stem quarter turn valve 4 by a combination of compression and frictional interference. Conventional injection valves do not provide a seal at this interface, therefore leakage may occur until the sealant can be injected. Leakage can recur and can migrate around the stem to the environment resulting in increased hydrocarbon emissions.

Industry standards call for double means of isolation, or redundant seals. Referring to FIGS. 1, 3, 4 and 13, as illustrated, the present invention additionally installs a completion cap 25 over the mechanical working components, that is over the entire second end of the fitting 1 and the internal valve 4 and its components. The completion cap 25 is threaded internally 26 to mate with the external threads 7 at the second end of the fitting, and is long enough to completely cover the threads 7 and further to bear against and to seat against a compressible sealing seat ring 27. FIG. 1, 3 and 4. The completion cap is provided with wrench flats 28 for easy installation or removal with common tools. FIGS. 1, 3, 4, 13.

Multiple seals are thus provided by the present invention. The stem 10 has a head 13 machined to the same taper (conical in the described embodiment although other shapes are within the scope of the invention) as the counter-drilled metal seat 17. FIG. 4. This feature allows the seat to be mechanically actuated by burnishing the two metallic surfaces 13 and 20. The completion plug 22, 34 is installed to effect a metal seal at the open end when the process is completed. FIG. 3. To provide secondary seals in the event of any failure, a completion cap 25 is attached to the external thread 7 of the fitting 1 and the completion cap 25 fully envelopes the threads and seats against a soft mechanical sealing ring 26. FIG. 3. These features allow the use of conventional hardware in the performance of sealing a leaking packing gland or other container under pressure without specialty equipment.

The present invention allows the sealing procedures to be performed with less risk of extending, specialty, equipment such as external gate or ball valves attached to conventional injection valve apparatus. Such devices and associated procedures were described above and are illustrated in part in FIG. 6. FIG. 6 illustrates a typical attachment fitting 30, an extending and connected valve 31, and extending and connected quick couple attachment 32, and finally a further extending and connected packing gland 33. In addition, to prevent disabling the valve as the sealant is injected, special injectors are often used that must be installed longitudinal to the orifice to the adapter, further extending the length of the installation equipment. Also illustrated in FIG. 6 is the conventional method of installing a completion plug 34, by the use of a drive setting tool 35.

The present invention thus eliminates 2 steps from the current practice, (1) the use of an injection tube and (2) the use of a plug setter for the completion plug. The invention permits the direct threading of the injection gun at the distal end 8 of the fitting immediately after removal of the high pressure packing gland and the direct insertion of the completion plug 22 once the injection gun is removed.

It is readily apparent from FIG. 6 that such extending specialty equipment creates additional leverage and stress to the attachment connection between the valve body 2 and the fitting 30, regardless of whether the fitting is attached by friction welding or a threaded connection or otherwise. Allowing for the use of conventional installation and injection equipment, the process of the present invention can be performed in a most cost effective manner and at the same time, the time the operator is exposed to potential hazards is reduced.

The present invention is used as both the main valve and the connection fitting in the valve re-packing procedure. The invention represents significant improvements over present methods due to its compact design and additional scaling features. The disadvantage of conventional systems in use, such as leakage at the integral stem creating additional paths for hydrocarbon emissions are obviated. The risk of using the secondary containment bodies such as ball valves that connect to adapters which extend the length of the assembly is also eliminated.

Use of the invention

The use of the invention will be described with particular reference to FIGS. 5(a) and 9–14. The present invention is used when a valve packing gland 3 is exhausted due to duty or incompatibility to the fluid service. The first step in this connective procedure is to attach the fitting 1 to the valve body 2, usually by the drill and tap method as illustrated in FIGS. 5 and 7 and 11–13. Other means of attachment are envisioned and are within the scope of this invention. For instance, it is also considered within the scope of the invention to mount the fitting 1 to a valve body by means of friction welding as in FIGS. 8(a) and 8(c).

Once the fitting is attached, as described in more detail below, the installation technician will attach a high pressure external packing gland 21 with the boring tool 41 enveloped. FIG. 5. The high pressure packing gland 21 is a standard tool such as pioneered by TEAM, Inc. in the early 1980s. The high pressure packing gland 21 will attach to the internal tapered pipe threads 7 of the open end of the fitting 1. A pressure test or emissions check can be performed to ensure the attachments are leak tight prior to reaching the pressurized valve. Once the test is completed, the boring tool is advanced through the longitudinal orifice 6 extending through the fitting 1 and valve stem 10 and port 19 in the open position. The boring tool is rotated by use of the hand control drill attached to the shank of the boring tool 41 which extends through the length of the fitting 1 and high pressure packing gland 21. The boring tool is actuated longitudinally into the valve body 2 until the packing area 3 is reached. The installation technician withdraws the boring tool through the fitting 1 past the stem 10 to the original start position but still within the high pressure packing gland 21. To prevent the inadvertent withdrawal of the boring tool through the high pressure packing gland, a mechanical stop can be attached to the tool. The valve stem 10 is then rotated a quarter turn in the clockwise direction to the shut position. In this position, the longitudinal orifice or port 19 in the stem is perpendicular to the orifice 6 in the fitting body.

The stem 10 has a head 13 that is machined to the same taper as the counter-bore 17 in the body of the fitting or plug 1. The undersurface 14 of the head of the stem actuates in downward thrust against the seat 11 forcing a compression seal between the fitting body at 17, the composite seat 11, and the head of the stem at 14. In addition, the conical head bears against a counter-bore and due to frictional interaction, burnishes, that is cuts a metallic seat interface.

The longitudinal orifice 6 between the stem 10 and the high pressure packing gland 21 is then bled of internal pressure and the high pressure packing gland 21 is removed. A sealant injection gun is attached to the second and open end of the fitting 1 at the internal tapered threads 7. The injection gun is pressurized, typically by use of the hydraulic pump internal to the gun, to fill in the space between the sealant gun terminal end and the stem. This will prevent intrusion of the fluid service into the injection gun contaminating the internals. The stem 10 is rotated a quarter turn clockwise to the open position to allow the stem orifice or port 19 to be in line with the fitting orifice 6. The sealant is further injected through this orifice 6 to the valve 2 into the valve packing gland area 3.

Injection of the sealant continues until the area is filled and compression of the injected sealant is made by use of the valve follower bolting 29. Once the seal is completed, injection is stopped and the gland is further compressed. A visual indication of the completion of the seal is extrusion of the sealant material. The quarter turn valve stem is then closed and the seal achieved is previously described. The injection gun is removed by disconnecting the threaded coupling at the open end of the fitting 1. A completion plug 22 is installed into the second, open end threaded connection using the internal tapered threads 7, which develops a metallic seal by the inter-locking of the threads.

A completion cap 25 is installed at the same second end by use of external threads 8. The completion cap 25 covers all operating mechanisms and establishes a redundant seal in the event that previously defined seals develop leakage. The completion cap 25 is engaged the full length of the external threads 8 to a soft metallic seat sealing ring 27. The metallic seat ring 27 deform against the surfaces of both the surface external to the fitting at 37 and the end of the completion cap at 38. FIG. 3. As the completion cap is fully engaged to bear against the metallic seat ring, the seat ring 27 deforms against the surfaces and fills any discontinuity creating an additional metallic seal.

The primary embodiment of the present invention envisions that the materials of construction for the Quadra-Seal body completion cap and completion plug would be of 304 stainless steel. Alternatively, these components could be of carbon steel, or depending upon the application, of other materials for composites. The primary embodiments of the composite seat, Quadra-Seal stem and completion cap ring are glass filled Teflon, T-6011 aluminum and T-6011 aluminum respectively. Alternates for the composite seat would be Teflon or brass and an alternate for the Quadra-Seal stem would be 304 stainless steel. It is also envisioned that the valve stem and cap could be provided by using an appropriately specified machine or aircraft screw. The selection of components so that the head of the valve stem and the seat are of different hardness will allow for one to deform and conform to the other during assembly to create the best seal.

Detailed Description of the Method of the Invention

Figure 9:
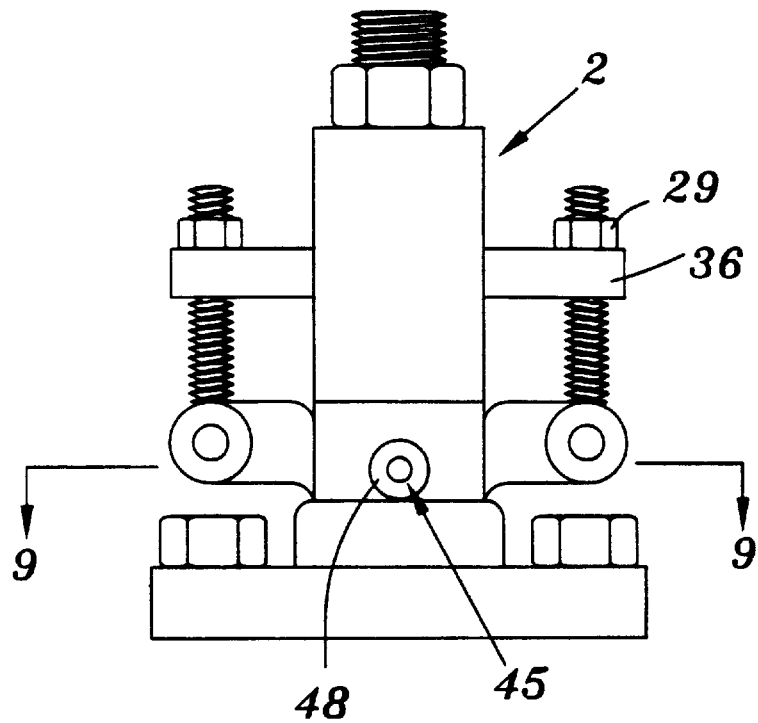
FIG. 9: is an elevation of a valve body detailing the installation site for the invention.
Figure 10:
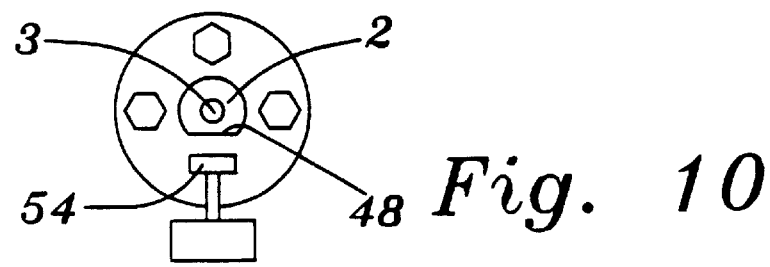
FIG. 10: is a cross section through FIG. 9.
Figure 11:
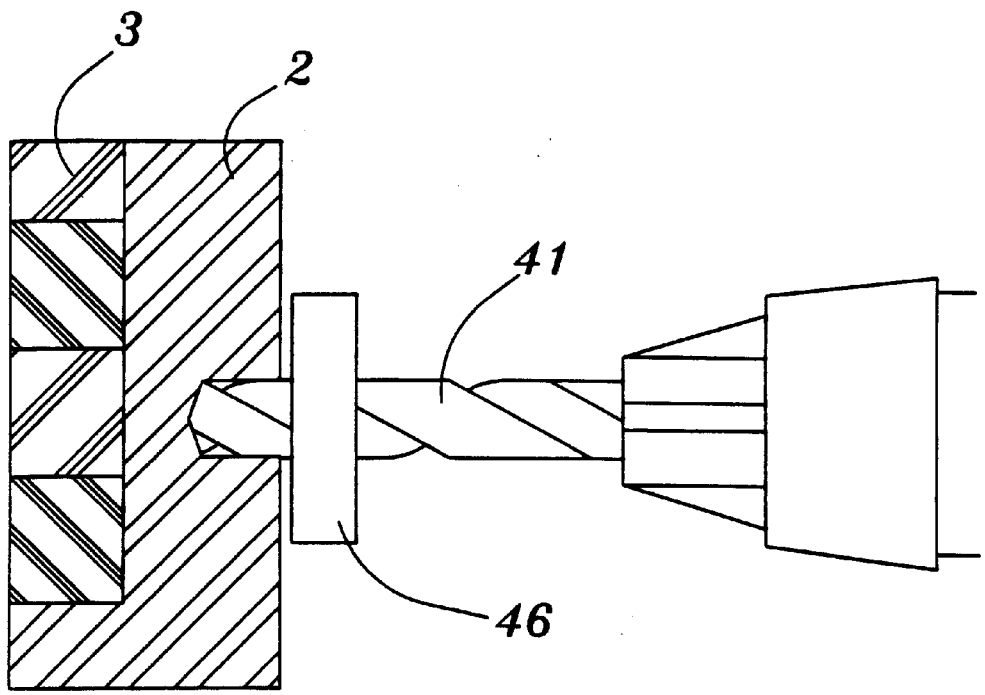
FIG. 11: is a cross section illustrating an installation step from the present method.
Figure 12:
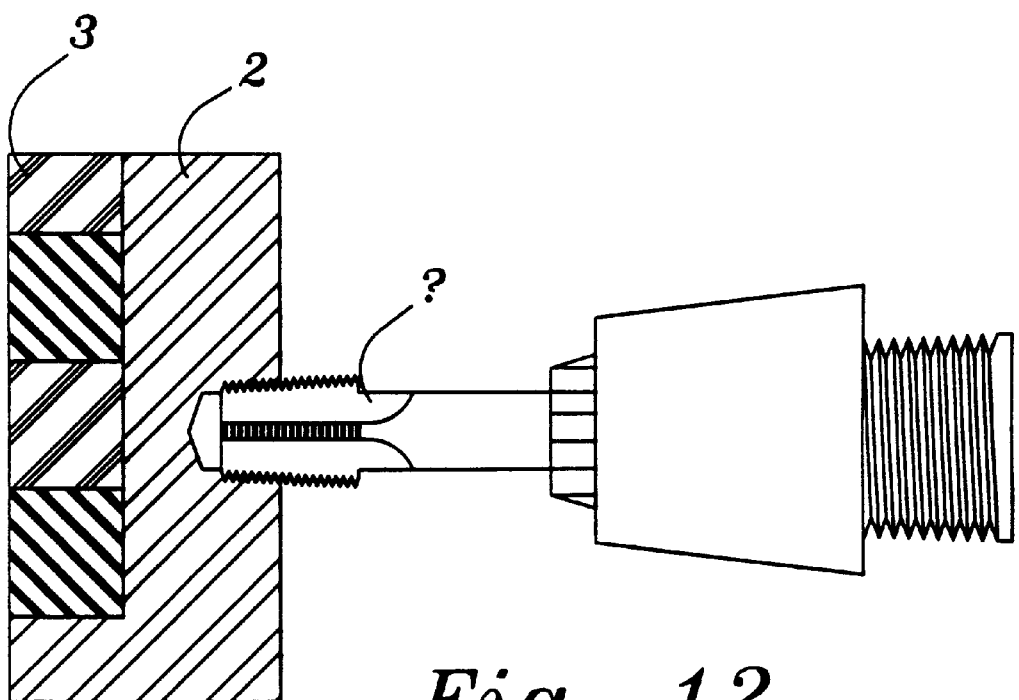
FIG. 12: is a cross sections illustrating an installation step from the present method.
Figure 13:
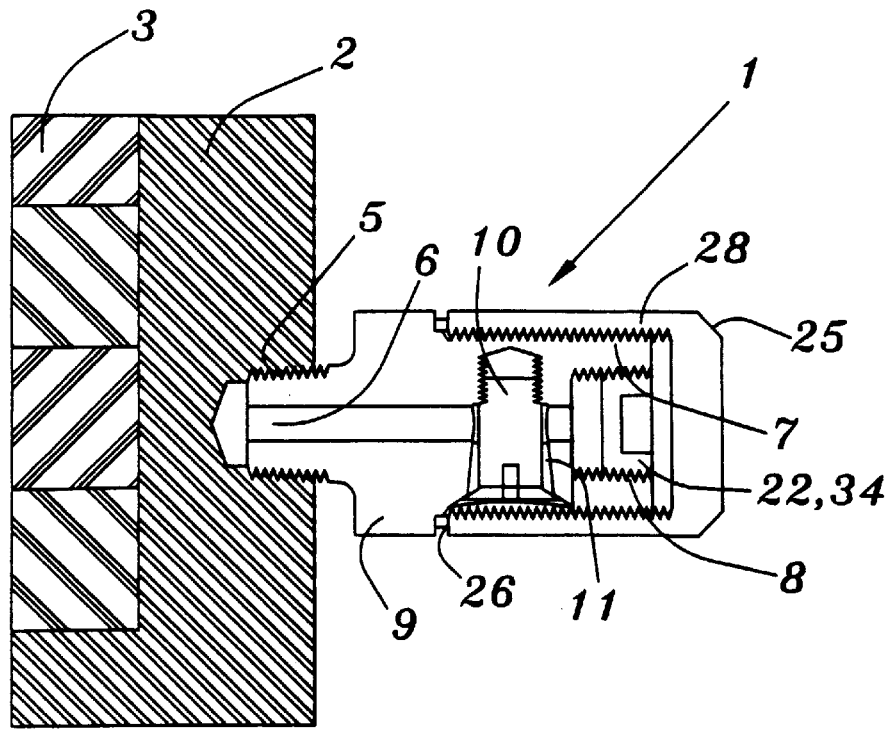
FIG. 13: is a cross section illustrating an installation step from the present method.
Figure 14:
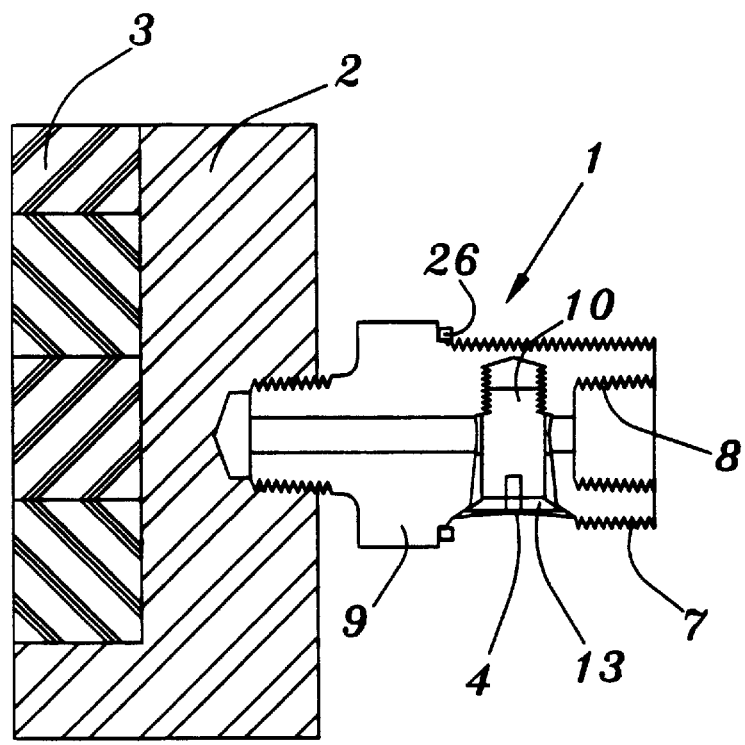
FIG. 14: is a cross sections illustrating an installation step from the present method.

The method of the present invention will be described, with particular reference to FIGS. 5(a) and 9–14, incorporating by reference the previous descriptions of the device. The initial step in attaching the fitting 1 to a valve body 2 is to use a center punch to mark the exterior of the valve body at 45. FIG. 9. The thickness of the valve body is measured with a gauge and a drill bit 41 is provided with a stop collar 46 so that a hole can be drilled in the exterior of the valve body that does not penetrate completely through the body of the valve. FIG. 7(a), FIG. 11. The hole is then provided with threads by tapping it. FIG. 7(b), FIG. 12. The injection plug 1 is then installed. FIG. 13. The completion cap 25 is removed. The completion plug 22 is removed and an external packing gland 21 is installed on the threads on the interior of the fitting 1. FIG. 5(a).

Figure 15:
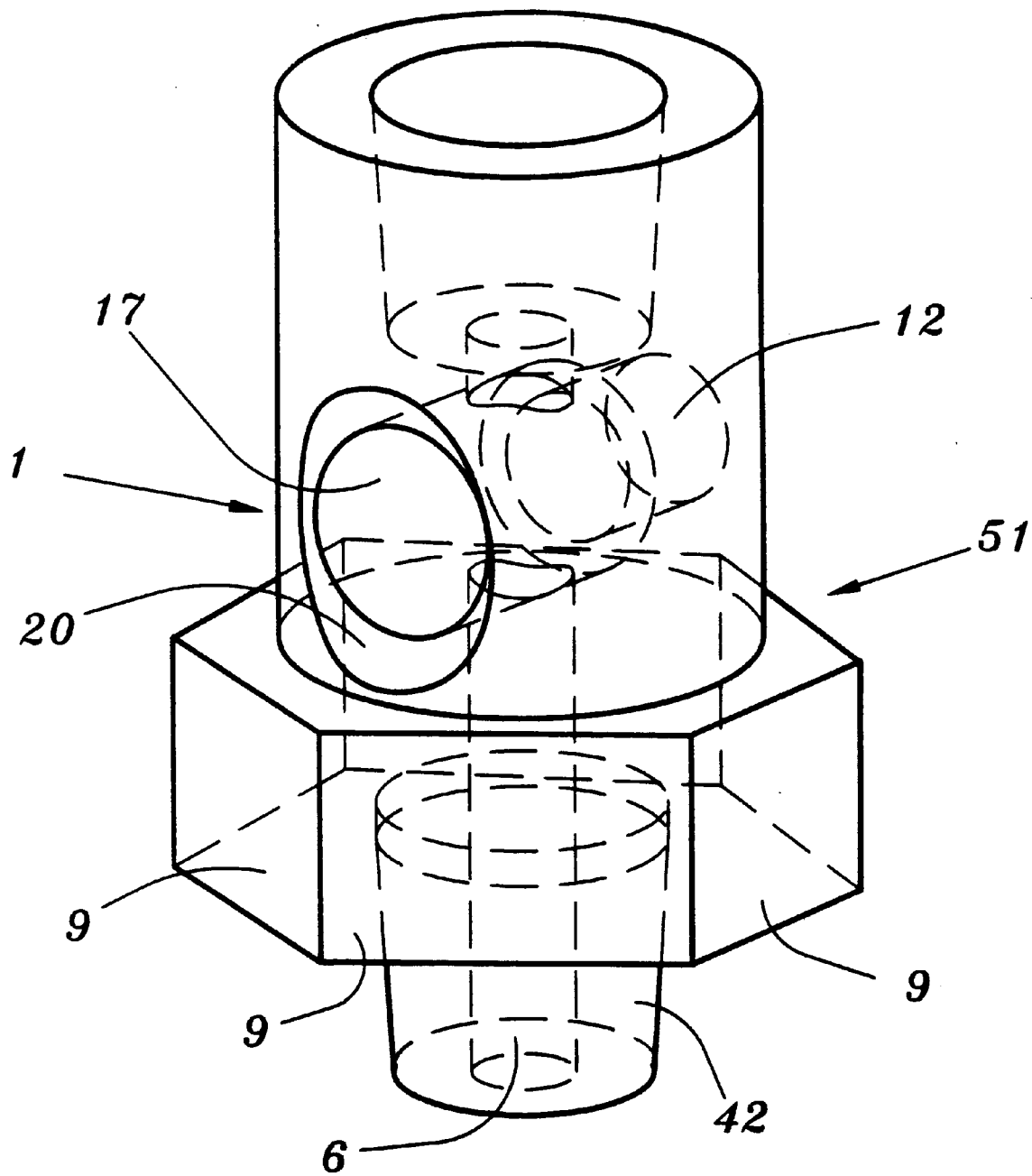
FIG. 15: is a perspective ghost view of the blank for forming the fitting of the present invention.

As an alternative to the described method of drilling and tapping a threaded connection the invention can be connected by friction welding. Friction welding can be done by adapting the injection plug or fitting 1 with a hexagonal shape 51 and wrench flats 9, (FIG. 15) so as to be operatively formed to be compatible by connection 52 with a friction welder 47, such as SEASTUD portable friction welding device as manufactured by RAM FORCE, Ltd. of 1 Shield Cres., Booragoon, West Australia. Alternatively, similar shapes can be used so as to be compatible with the robotic pneumatic tool friction welders offered by Florida Pneumatic Manufacturing Corporation, Jupiter Park Lane, Jupiter, Fla. Friction welding procedures will be carried out in accordance with ASTN QW-262 Welding Variables Procedures Specifications (WPS) or Procedures Specifications QW-402–403, QW-406–408 and QW-410. Alternatively, the friction welding variables can be determined by those of skill in the art such as by referring to Chapter 23, friction welding, prepared by the committee working on the ASME welding handbook as published by Ohio State University, authored by J. C. Papritan. As taught in the various materials known in the art, the basic components of frictional welding are speed, pressure, time and travel The basic blank (FIG.15) for the plug fitting 1 can be shaped for adaptation to either threaded connection as in FIGS. 1 through 4 or without threads on the connection end for friction welded connection as in FIG. 8(b). Alternatively embodiments as in FIG. 8(a) or (b) with longer connection ends 42 can be made for connection in narrow or confined spaces.

The balanced configuration of the present invention, with its internal valve 4 and recessed head 13 is particularly suited to friction welding which requires high rotational speeds.

A further variation potentially necessary or desirable when friction welding the fitting to a smaller valve or any short radius curved surface would be to use a grinding wheel 54 to first mill or grind the surface on the valve body to a minimum flat area of acceptable diameter as at 48 so that the fitting friction welded will have the proper weld penetration and cross sectional area 50. FIGS. 8(c) and 10.

After the fitting is attached to the pressure containment body or valve 2, the next step is to measure the distance to provide an accurate gauge through the entire assembly and completely through the valve body adjacent the packing material within the valve body or into the pressure containment body. A smaller drill bit is provided with a stop collar to control the depth of the bore. The valve 4 is opened and smaller drill bit passed through to contact the remaining section to be penetrated in the valve body 2 into the valve packing area 3. The remaining hole or bore into the interior of the valve body is made, the small drill stem pulled back past the quarter turn valve 4 and the quarter tun valve 4 is sealed. Next the packing assembly 21 is removed from the fitting or injection plug 1. A sealant injection apparatus is installed on the injection plug 1, the valve 4 is opened and a sealant is injected through the injection device into the interior of the valve body and into the valve packing area 3. The valve follower bolting 29 can be loosened and the process of injecting additional sealant into the valve body continued until the valve packing chamber 3 is full. Next the quarter turn valve 4 is closed and the injection device removed from the fitting or injection plug 1. The emissions levels of the valve are tested with OVA meter at the valve stem and at the injection plug. If the levels are within the approved range, the completion plug 22 is installed sealing the open end and the completion cap 25 installed over the entire distal end of the fitting 1 and valve 4 to provide a foul point seal. The four seals of the "Quadra-Seal" device are (1) an internal composite seat that seals the rotational stem of the internal quarter turn valve, (2) a conical metallic seal on the interior of the opening provided for the stem of the quarter turn valve (the stem of the quarter turned valve is softer than the seat) and so as it is installed, it deforms to form its own additional seal within the seat, (3) a completion plug to seal the open end, and (4) the fourth seal is a completion cap with a metallic sealing seat ring.

The quick installation procedure reduces the emission time or the exposure time of the operator to the volatile hydrocarbon emissions. The installation procedure meets EPA requirements. The application process is completely leak free. The valve remains fully operable during the installation procedure.

As to the manner of operation and use of the present invention, the same is made apparent from the foregoing discussion. With respect to the above description, it is to be realized that although dimensional embodiments of specific materials is disclosed, these enabling embodiments are illustrative, and the optimum dimension relationships for the parts of the invention are to include variations in size, materials, shape, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention. What is claimed as being new and desired to be protected by letters patent is as follows:

We claim:

1. An improved apparatus for tripping into a body holding a fluid under pressure while preventing the escape of the fluid, comprising:
   (A) a fitting body for attachment at a first end to a pressurized body;
   (B) a longitudinal orifice through said fitting body from said first end to a second end;
   (C) an internal valve mounted in said fitting body adapted for movement between an opened and closed position for respectively permitting and inhibiting fluid communication between said first and second ends of said fitting body, wherein said internal valve mounted in said fitting body comprises a bore into said fitting body perpendicular to and intersecting with said longitudinal orifice which forms a chamber for a valve stem and a cylindrical valve seat adapted for sealing fit between the surfaces of said bore and said valve stem, with valve ports through said cylindrical seat and a valve port in said stem positioned for alignment with said longitudinal orifice when said internal valve is in its opened position;
   (D) an end plug for sealing said orifice internally at said second end of said fitting body; and
   (E) a cap for sealing and enclosing said end plug and said valve externally at said second end of said fitting body, thereby limiting access to said second end and said valve.

2. The invention of claim 1 wherein:
   (A) said valve stem is externally threaded on a first end and provided with a head on said second end;
   (B) said bore into said fitting body which forms said valve chamber is internally threaded at the bottom of said bore to correspond with said external threads of said valve stem and wherein said bore forms a seating shoulder near said threaded bottom portion of said bore located below said longitudinal bore so as to seat a first, lower portion of said cylindrical seat below said longitudinal bore;
   (C) said head of said valve stem is provided with a tapered undersurface;
   (D) the aperture of said bore into said fitting is countersunk to correspond to the tapered undersurface of said valve stem head providing a tapered concavity at the top of said bore, and to ensure that the top of said valve stem head does not protrude when said valve stem is fully inserted into said internal threads; and,
   (E) said cylindrical valve seat is sized along its longitudinal axis so that when said seat is inserted into said bore a lower end is seated against said seating shoulder and a second, upper portion protrudes into said tapered concavity prior to insertion of said valve stem, so that said cylindrical seat is compressed axially between the head of the stem and said seating shoulder of said bore to expand radially enhancing the seal between the surfaces of said bore and said stem as said stem is fully inserted into said internal threads.

3. The invention of claim 2 wherein said first end is threadedly connected to said pressurized body.

4. The invention of claim 2 wherein said first end is friction welded to said pressurized body.

5. The invention of claim 2 wherein said cylindrical valve seat is formed of glass filled Teflon.

6. The invention of claim 2 wherein said cylindrical valve seat is formed of nylon.

7. The invention of claim 2 wherein said fitting body and said end plug and said completion cap are stainless steel.

8. The invention of claim 2 wherein said valve stem and cap are T-6011 aluminum.

9. The invention of claim 2 further comprising an injection gun attachable to said second end of said fitting for injecting a sealant into said pressurized body.

10. The invention of claim 1 wherein:
    (A) said second end of said fitting body is threaded externally and internally, and wherein said internal threads are tapered threads;
    (B) said end plug is threaded externally with tapered threads to correspond to and interconnect with said internal tapered threads of said second end of said fitting body;
    (C) a sealing ring for sealing interposition between said fitting body and the rim of the open end of said cup; and
    (D) said cap is internally threaded to correspond to and interconnect with said external threads of said second end of said fitting body, wherein said cap is longer than said external threads and can compress said sealing ring between said cap and said fitting body to completely encase and seal said second end of said fitting body and said internal valve within said cap, thereby limiting access to said second end and said valve.

11. The invention of claim 10 wherein said first end is threaddedly connected to said pressurized body.

12. The invention of claim 10 wherein said first end is friction welded to said pressurized body.

13. The invention of claim 10 further comprising a seating surface on said fitting and wherein said sealing seating ring is interposed between said cap and said sealing surface.

14. The invention of claim 10 further comprising an injection gun attachable to said second end of said fitting for injecting a sealant into said pressurized body.

15. The invention of claim 10 wherein said cylindrical valve seat is formed of glass filled Teflon, said fitting body and said end plug and completion cap are stainless steel, and said valve stem and cap are T-6011 aluminum.

16. An apparatus for injecting a sealant into a pressurized body comprising:
    (A) Housing forming a longitude bore there through for receipt of a boring means, said housing having an attachment end and a second end, said attachment end adapted to be coupled to the exterior of a pressurized body and said second end adapted to receive a seal which sealingly engages said boring means thus, preventing the communication of fluid from escaping past said seal and exiting the housing;
    (B) A means for rotation of said housing and integral with said housing located between the attachment end and the second end for coupling said housing to the exterior of pressurized body;
    (C) A threaded valve positionable within said housing and adapted for movement between an open and closed position to relegate fluid communication between said attachment and second ends of said housing; said valve adapted to receive said boring means there through when said valve is an open position and permits said boring means to pass through the attachment end and into said pressurized body;
    (D) An injection gun attachable to said second end of said second housing for injecting a sealant into said pressurized body after said boring means has been removed and said threaded valve is in its opened position, thereby preventing the communication of fluid from escaping past said seal and exiting the housing;

(E) A completion plug positionable in the second end of said housing once the injection gun and seal are removed and the threaded valve is closed for preventing the escape of fluid from the housing; and (F) A cap connected to and adapted to sealingly compress against said housing and completely encasing said second end and said threaded valve of said housing within said cap, thereby limiting access to said second end and said valve.

17. The housing of claim 16 wherein said attachment end is friction welded to the pressurized body.

18. The housing of claim 16 wherein said attachment end is threadedly connected to the pressurized body.

19. The threaded valve of claim 16 further comprising a head recessed within said housing for improved sealing.

20. The threaded valve of claim 19 wherein said threads are nylon coated for an improved seal within said housing.

21. The rotation means of claim 16 wherein said means is manual for threadedly connecting the attachment end of said housing to the pressurized body.

22. A method of tapping into a body holding a fluid under pressure to attach a connection fitting while preventing the escape of the fluid, and of providing multiple seals to prevent fluid escape through the connection fitting once attach, said method comprising the steps of:

(A) mounting a sealed internal valve within a fitting body which defines a longitudinal orifice from a first end to a second end of said fitting body;

(B) attaching said first end of said fitting body to a pressurized body;

(C) attaching a seal adapted to receive a boring tool to said second end of said fitting body;

(D) inserting a boring tool into said receiving seal;

(E) opening said sealed internal valve;

(F) passing said boring tool through said fitting and the open port of said internal valve and boring an opening into said pressurized body;

(G) partially withdrawing said boring tool through said valve port and closing said internal valve before withdrawing said boring tool from said receiving seal;

(H) inserting an end plug to seal said second end of said fitting body; and, (I) attaching a cap to completely encapsulate and seal said second end of said fitting body and said internal valve, thereby limiting access to said second end and said valve.

23. The invention of claim 22 wherein said step of attaching said fitting body to said pressurized body further comprises the steps of forming threads on said first end of said fitting body and drilling and tapping a matching threaded connection for said fitting body on said pressurized body.

24. The invention of claim 22 wherein said step of attaching said fitting body to said pressurized body comprises friction welding said fitting body and internal valve to said pressurized body.

25. The invention of claim 22 wherein said step of mounting said internal valve comprises the steps of (A) forming a first bore into said fitting body perpendicular to and intersecting with said longitudinal orifice and to a depth beyond said longitudinal orifice but not completely through said fitting body;

(B) forming threads internally at the bottom of said first bore;

(C) forming a second larger bore co axial to said first bore, to a lesser depth but beyond said longitudinal orifice to form a seating shoulder;

(D) forming a tapered concavity in said fitting body at the aperture of said bores;

(E) mounting a cylindrical valve seal within said bores, seated against said seating shoulder at a first, lower end and extending above the interface of said concavity and said second bore at a second upper end; and, (F) forming a valve stem for sealing fit to said cylindrical valve seal and with an externally threaded lower end for interconnection to said internal threads at the bottom of said first bore and a head at its second upper end, wherein said head has a tapered undersurface for sealing fit to said tapered concavity in said fitting body at the aperture of said bores.

26. The invention of claim 25 wherein said step of mounting said internal valve further comprises the steps of (A) fully inserting said valve stem until said head is sealed against said tapered concavity and said upper portion of said cylindrical seal;

(B) rotating said valve stem one quartet turn; and, (C) inserting a boring tool into said longitudinal orifice and passing said boring tool through said fitting and boring through said cylindrical seal and said valve stem to form the port of said internal valve, and boring an opening into said pressurized body.

* * * * *